US012475844B2

(12) United States Patent
Chen et al.

(10) Patent No.: US 12,475,844 B2
(45) Date of Patent: Nov. 18, 2025

(54) PIXEL CIRCUIT, PIXEL DRIVING METHOD, AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Wenbo Chen, Beijing (CN); Quanyong Gu, Beijing (CN); Ziyang Yu, Beijing (CN); Zhiliang Jiang, Beijing (CN); Ming Hu, Beijing (CN)

(73) Assignees: CHENGDU BOE OPTOELECTRONICS TECHNOLOGY CO., LTD., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/560,980

(22) PCT Filed: Feb. 24, 2023

(86) PCT No.: PCT/CN2023/078066

§ 371 (c)(1),
(2) Date: Nov. 15, 2023

(87) PCT Pub. No.: WO2024/174211

PCT Pub. Date: Aug. 29, 2024

(65) Prior Publication Data

US 2025/0095572 A1 Mar. 20, 2025

(51) Int. Cl.
*G09G 3/3233* (2016.01)

(52) U.S. Cl.
CPC ... *G09G 3/3233* (2013.01); *G09G 2300/0408* (2013.01); *G09G 2300/0819* (2013.01);
(Continued)

(58) Field of Classification Search
CPC ......... G09G 3/3233; G09G 2300/0408; G09G 2300/0819; G09G 2300/0842;
(Continued)

(56) References Cited

U.S. PATENT DOCUMENTS

2015/0339976 A1* 11/2015 Tsai .................... G09G 3/3258 315/172
2021/0104196 A1 4/2021 Yuan
(Continued)

FOREIGN PATENT DOCUMENTS

CN 112102785 A 12/2020
CN 112150964 A 12/2020
(Continued)

*Primary Examiner* — Stephen G Sherman
(74) *Attorney, Agent, or Firm* — WHDA, LLP

(57) ABSTRACT

A pixel circuit, a pixel driving method, and a display device. The pixel circuit includes a light-emitting element, a driving circuit, and a data writing circuit; the data writing circuit is electrically connected to a first scanning terminal, a data line and a first terminal of the driving circuit, and is configured to write a data voltage provided by the data line into the first terminal of the driving circuit under control of a first scanning signal provided by the first scanning terminal during a data writing phase included in a refresh frame, and write a reset voltage provided by the data line into the first terminal of the driving circuit under control of the first scanning signal during a reset phase included in a hold frame; the driving circuit is configured to drive the light-emitting element under control of a potential of a control terminal thereof.

8 Claims, 6 Drawing Sheets

(52) U.S. Cl.
CPC ............... *G09G 2300/0842* (2013.01); *G09G 2300/0861* (2013.01); *G09G 2310/0286* (2013.01); *G09G 2310/08* (2013.01); *G09G 2320/0247* (2013.01); *G09G 2330/021* (2013.01)

(58) Field of Classification Search
CPC ... G09G 2300/0861; G09G 2310/0286; G09G 2310/08; G09G 2320/0247; G09G 2330/021
See application file for complete search history.

(56) References Cited

U.S. PATENT DOCUMENTS

| | | | | |
|---|---|---|---|---|
| 2021/0287614 | A1 | 9/2021 | Xiong et al. | |
| 2021/0407384 | A1 | 12/2021 | Yuan et al. | |
| 2024/0221646 | A1* | 7/2024 | Chen .................... | G09G 3/3233 |

FOREIGN PATENT DOCUMENTS

| | | | |
|---|---|---|---|
| CN | 113012643 | A | 6/2021 |
| CN | 113838420 | A | 12/2021 |
| CN | 115240599 | A | 10/2022 |

* cited by examiner

PIXEL CIRCUIT, PIXEL DRIVING METHOD, AND DISPLAY DEVICE

CROSS-REFERENCE TO RELATED APPLICATIONS

This application is the U.S. national phase of PCT Application No. PCT/CN2023/078066 filed on Feb. 24, 2023, the disclosures of which are incorporated in their entirety by reference herein.

TECHNICAL FIELD

The present disclosure relates to the technical field of displays, and more particularly to a pixel circuit, a pixel driving method, and a display device.

BACKGROUND

In the related art, when the pixel circuit performs a low frequency display, the display period includes a refresh frame and at least one hold frame arranged in succession, and in the hold frame, if the driving transistor is not controlled to be in a predetermined bias state during the non-light emitting period, the characteristic of the driving transistor may drift.

SUMMARY

In an aspect, an embodiment of the present disclosure provides a pixel circuit, including a light-emitting element, a driving circuit, and a data writing circuit;

the data writing circuit is electrically connected to a first scanning terminal, a data line and a first terminal of the driving circuit, and is configured to write a data voltage provided by the data line into the first terminal of the driving circuit under control of a first scanning signal provided by the first scanning terminal during a data writing phase included in a refresh frame, and write a reset voltage provided by the data line into the first terminal of the driving circuit under control of the first scanning signal during a reset phase included in a hold frame;

the driving circuit is configured to drive the light-emitting element under control of a potential of a control terminal thereof.

Optionally, in at least one embodiment of the present disclosure, the pixel circuit further includes a compensation control circuit, a first initialization circuit and a storage circuit;

the compensation control circuit is electrically connected to a compensation control terminal, the control terminal of the driving circuit and a second terminal of the driving circuit, and is configured to control connection between the control terminal of the driving circuit and the second terminal of the driving circuit under control of a compensation control signal provided by the compensation control terminal;

the first initialization circuit is electrically connected to an initial control terminal, a first initial voltage terminal and the control terminal of the driving circuit, and is configured to control to provide a first initial voltage provided by the first initial voltage terminal to the control terminal of the driving circuit under control of an initial control signal provided by the initial control terminal;

the storage circuit is electrically connected to a control terminal of the driving circuit, and is configured to store electric energy.

Optionally, an effective voltage duration of the initial control signal is longer than an effective voltage duration of the first scanning signal;

an effective voltage duration of the compensation control signal is longer than an effective voltage duration of the first scanning signal.

Optionally, in at least one embodiment of the present disclosure, the pixel circuit further includes a second initialization circuit;

the second initialization circuit is electrically connected to the first scanning terminal, a second initial voltage terminal and a first electrode of the light-emitting element, and is configured to write a second initial voltage provided by the second initial voltage terminal into the first electrode of the light-emitting element under control of the first scanning signal during the data writing phase included in the refresh frame, and write a second initial voltage provided by the second initial voltage terminal in to the first electrode of the light-emitting element under control of the first scanning signal during the reset phase included in the hold frame.

Optionally, in at least one embodiment of the present disclosure, the pixel circuit further includes a first light-emitting control circuit and a second light-emitting control circuit;

the first light-emitting control circuit is electrically connected to a light-emitting control terminal, a power supply voltage terminal and the first terminal of the driving circuit, and is configured to control connection between the power supply voltage terminal and the first terminal of the driving circuit under control of a light-emitting control signal provided by the light-emitting control terminal;

the second light-emitting control circuit is electrically connected to the light-emitting control terminal, the second terminal of the driving circuit and the first electrode of the light-emitting element, and is configured to control connection between the second terminal of the driving circuit and the first electrode of the light-emitting element under control of the light-emitting control signal;

a second electrode of the light-emitting element is electrically connected to a first voltage terminal.

In a second aspect, an embodiment of the present disclosure provides a pixel driving method applied to the above-mentioned pixel circuit, wherein a display period including a refresh frame and a hold frame; the refresh frame comprises a data writing phase, and the hold frame comprises a reset phase; the pixel driving method comprises:

in the data writing phase included in the refresh frame, a data writing circuit writes a data voltage provided by a data line into a first terminal of a driving circuit under control of a first scanning signal;

in the reset phase included in the hold frame, the data writing circuit writes a reset voltage provided by the data line into a first terminal of the driving circuit under control of the first scanning signal so that a driving transistor included in the driving circuit is in a bias state.

Optionally, the pixel circuit further comprises a compensation control circuit, a first initialization circuit, a storage circuit, a first light-emitting control circuit and a second light-emitting control circuit; the refresh frame further comprises an initialization phase, a compensation stage and a refresh light-emitting phase which are arranged successively; the data writing phase is comprised in the compensation phase; the pixel driving method further comprises:

in the initialization phase, the first initialization circuit controls to provide a first initial voltage to a control terminal of the driving circuit under control of an initial control signal;

in the compensation phase, the compensation control circuit controls connection between the control terminal of the driving circuit and a second terminal of the driving circuit under control of a compensation control signal;

in refresh light-emitting phase, the first light-emitting control circuit controls connection between a power supply voltage terminal and the first terminal of the driving circuit under control of a light-emitting control signal; the second light-emission control circuit controls connection between the second terminal of the driving circuit and a first electrode of the light-emitting element under control of the light-emission control signal, and the driving circuit drives the light-emitting element under control of a potential of the control terminal thereof.

Optionally, the pixel circuit further includes a second initialization circuit; the pixel driving method further includes:

in the data writing phase included in the refresh frame, the second initialization circuit writes a second initial voltage provided by a second initial voltage terminal into the first electrode of the light-emitting element under control of the first scanning signal;

in the reset phase included in the hold frame, the second initialization circuit writes the second initial voltage provided by the second initial voltage terminal into the first electrode of the light-emitting element under control of the first scanning signal.

Optionally, hold frame further comprises a hold light-emitting phase, and the reset phase and the hold light-emitting phase are independent from each other; the pixel circuit further comprises a first light-emitting control circuit and a second light-emitting control circuit: the pixel driving method further comprises:

in the hold light-emitting phase, the first light-emitting control circuit controls connection between the power supply voltage terminal and the first terminal of the driving circuit under control of the light-emitting control signal; the second light-emitting control circuit controls connection between the second terminal of the driving circuit and the first electrode of the light-emitting element under control of the light-emitting control signal, and the driving circuit drives the light-emitting element under control of the potential of the control terminal thereof.

In a third aspect, an embodiment of the present disclosure provides a display device including the pixel circuit as described above.

Optionally, the pixel circuit further comprises a compensation control circuit, a first initialization circuit and a storage circuit;

the display device further comprises a first GOA module and a second GOA module;

the first GOA module is configured to generate a first scanning signal;

the second GOA module is configured to generate a compensation control signal and an initial control signal.

Optionally, the second GOA module comprises a multi-stage second driving circuit;

an $N^{th}$ stage second driving circuit is configured to provide the initial control signal for the pixel circuit, and an $(N+x)^{th}$ stage second driving circuit is configured to provide a compensation control signal for the pixel circuit; N and x are both positive integers.

Optionally, the first GOA module is electrically connected to a first voltage line and a second voltage line, and is configured to generate the first scanning signal according to a first voltage signal provided by the first voltage line and a second voltage signal provided by the second voltage line;

the second GOA module is electrically connected to a third voltage line and a fourth voltage line, and is configured to generate the compensation control signal and the initial control signal according to a third voltage signal provided by the third voltage line and a fourth voltage signal provided by the fourth voltage line.

Optionally, the first voltage line is configured to provide a first high voltage signal, and the second voltage line is configured to provide a first low voltage signal;

the third voltage line is configured to provide a second high voltage signal, and the fourth voltage line is configured to provide a second low voltage signal;

a voltage value of the first high voltage signal is different from a voltage value of the second high voltage signal, and a voltage value of the first low voltage signal is different from a voltage value of the second low voltage signal.

Optionally, in at least one embodiment of the present disclosure, the display device further includes a first resistor and a second resistor;

the first voltage line is electrically connected to the third voltage line through the first resistor, and the second voltage line is electrically connected to the fourth voltage line through the second resistor;

a resistance value of the first resistor is greater than a resistance value threshold and a resistance value of the second resistor is greater than a resistance value threshold.

Optionally, the pixel circuit further comprises a first light-emitting control circuit and a second light-emitting control circuit; the display device further comprises a third GOA module, and the third GOA module is configured to generate a light-emitting control signal.

DETAILED DESCRIPTION

The embodiments of the present disclosure will now be described more fully hereinafter with reference to the accompanying drawings, in which some, but not all embodiments of the disclosure are shown. Based on the embodiments in the present disclosure, all other embodiments obtained by a person of ordinary skill in the art without inventive effort fall within the scope of the present disclosure.

The transistors used in all the embodiments of the present disclosure may be thin film transistors or field effect transistors, or other devices with the same characteristics. In embodiments of the present disclosure, to distinguish the two electrodes of a transistor other than the gate electrode, one of the electrodes is referred to as a first electrode while the other one is referred to as a second electrode.

In practical operation, when the transistor is a thin film transistor or a field effect transistor, the first electrode may be the drain, and the second electrode may be the source; alternatively, the first electrode may the source, and the second electrode may be the drain.

Figure 1:
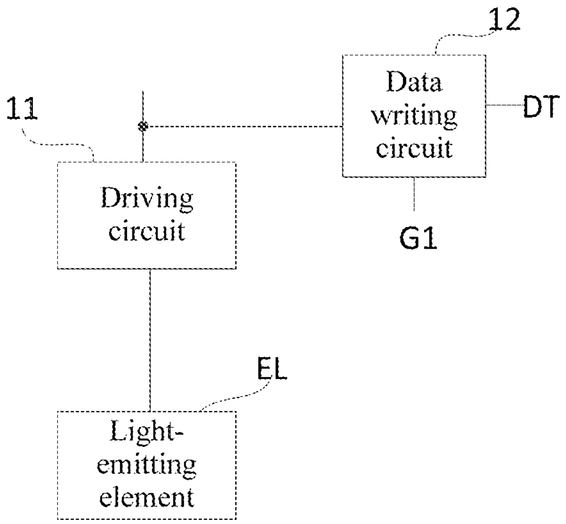
FIG. 1 is a structure diagram of a pixel circuit according to at least one embodiment of the present disclosure.

As shown in FIG. 1, the pixel circuit according to the embodiment of the present disclosure includes a light-emitting element EL, a driving circuit 11, and a data writing circuit 12;

The data writing circuit 12 is electrically connected to a first scanning terminal G1, a data line DT and a first terminal of the driving circuit 11 respectively, and is configured to write a data voltage Vdata provided by the data line DT into the first terminal of the driving circuit 11 under control of a first scanning signal provided by the first scanning terminal G1 during a data writing phase included in a refresh frame, and writing a reset voltage VR provided by the data line DT into the first terminal of the driving circuit 11 under control of the first scanning signal during a reset phase included in a bold frame;

the driving circuit 11 is configured to drive the light-emitting element EL under control of the potential of its control terminal.

In operation, the embodiment of the pixel circuit shown in FIG. 1 of the present disclosure, the hold frame includes a reset phase;

in the reset phase included in the hold frame, the data writing circuit 12 writes the reset voltage VR provided by the data line DT into the first terminal of the driving circuit 11 under control of the first scanning signal, so that the driving transistor included in the driving circuit 11 is in an on-bias state, improving hysteresis.

In the related art, when a pixel circuit performs a low-frequency display, a display period comprises a refresh frame and at least one hold frame arranged successively, and in the hold frame, if the driving transistor is not controlled to be in a predetermined bias state during a non-light-emitting phase, the characteristic of the driving transistor will drift; therefore, in a reset phase comprised in the hold frame, the embodiment of the present disclosure controls the driving transistor to be in an on-bias state, so as to improve the characteristic drift phenomenon of the driving transistor, improve the hysteresis phenomenon, and improve the quality of a low-gray-scale display.

The pixel circuit according to at least one embodiment of the present disclosure further comprises a compensation control circuit, a first initialization circuit and a storage circuit;

the compensation control circuit is electrically connected to a compensation control terminal, the control terminal of the driving circuit and a second terminal of the driving circuit, and is configured to control connection between the control terminal of the driving circuit and the second terminal of the driving circuit under control of a compensation control signal provided by the compensation control terminal;

the first initialization circuit is electrically connected to an initial control terminal, a first initial voltage terminal and the control terminal of the driving circuit, and is configured to control to provide a first initial voltage provided by the first initial voltage terminal to the control terminal of the driving circuit under control of an initial control signal provided by the initial control terminal;

the storage circuit is electrically connected to a control terminal of the driving circuit, and is configured to store electric energy.

In at least one embodiment of the present disclosure, the pixel circuit may include a compensation control circuit, a first initialization circuit, and a storage circuit;

the compensation control circuit controls connection between a control terminal of the driving circuit and a second terminal of the driving circuit under control of the compensation control signal: the first initialization circuit provides a second initial voltage to the control terminal of the driving circuit under control of the initial control signal: and the storage circuit stores electric energy.

Figure 2:
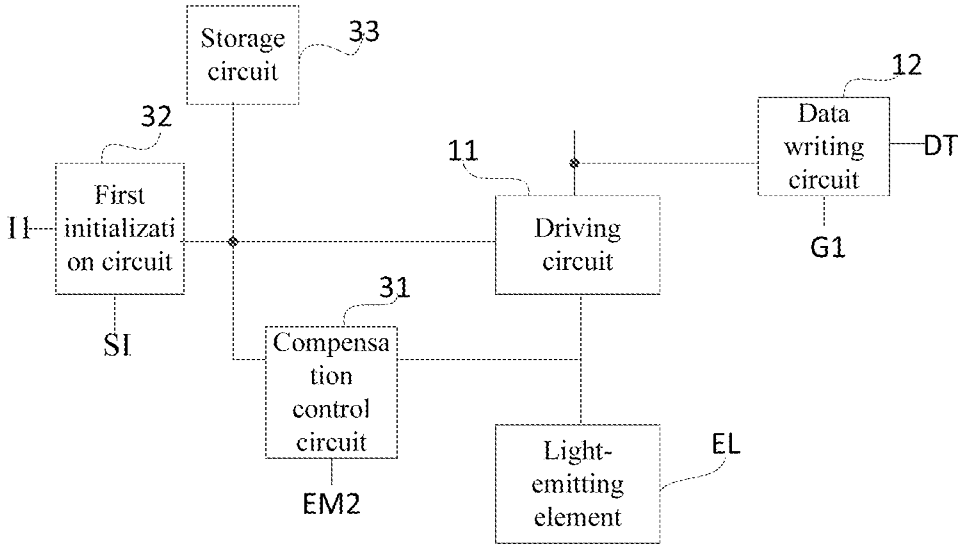
FIG. 2 is a structure diagram of a pixel circuit according to at least one embodiment of the present disclosure.

As shown in FIG. 2, on the basis of at least one embodiment of the pixel circuit shown in FIG. 1, the pixel circuit according to at least one embodiment of the present disclosure further comprises a compensation control circuit 31, a first initialization circuit 32 and a storage circuit 33;

the compensation control circuit 31 is respectively electrically connected to a compensation control terminal EM2, a control terminal of the driving circuit 11 and a second terminal of the driving circuit 11 for controlling the connection between the control terminal of the driving circuit 11 and the second terminal of the driving circuit 11 under control of a compensation control signal provided by the compensation control terminal EM2;

the first initialization circuit 32 is electrically connected to an initial control terminal SI, a first initial voltage terminal I1 and a control terminal of the driving circuit 11 respectively, and is used for controlling, under control of an initial control signal provided by the initial control terminal SI, to provide a first initial voltage Vinit1 provided by the first initial voltage terminal I1 to the control terminal of the driving circuit 11;

the storage circuit 33 is electrically connected to a control terminal of the driving circuit 11 for storing electric energy.

In at least one embodiment of the present disclosure, the effective voltage duration of the initial control signal is longer than the effective voltage duration of the first scanning signal;

an effective voltage duration of the compensation control signal is longer than an effective voltage duration of the first scanning signal.

In at least one embodiment of the present disclosure, the effective voltage duration of the initial control signal may refer to: the potential of the initial control signal lasts for an effective voltage;

when the transistor included in the first initialization circuit is an n-type transistor, the effective voltage may be a high voltage, and when the transistor included in the first initialization circuit is a p-type transistor, the effective voltage may be a low voltage;

the effective voltage duration of the first scanning signal may refer to: the potential of the first scanning signal lasts for an effective voltage;

when the transistor controlled by a high voltage when the transistor controlled by the first scanning signal is an n-type transistor, and the effective voltage may be a low voltage when the transistor controlled by the first scanning signal is a p-type transistor;

the effective voltage duration of the compensation control signal may be referred to as: the potential of the compensation control signal lasts for an effective voltage;

when the transistor included in the compensation control circuit is an n-type transistor, the utility voltage may be a high voltage, and when the transistor included in the compensation control circuit is a p-type transistor, the utility voltage may be a low voltage.

The pixel circuit of at least one embodiment of the present disclosure further includes a second initialization circuit;

the second initialization circuit is electrically connected to the first scanning terminal, a second initial voltage terminal and a first electrode of the light-emitting element, and is configured to write a second initial voltage provided by the second initial voltage terminal into the first electrode of the light-emitting element under control of the first scanning signal during the data writing phase included in the refresh frame, and write a second initial voltage provided by the second initial voltage terminal in to the first electrode of the light-emitting element under control of the first scanning signal during the reset phase included in the hold frame.

In at least one embodiment of the present disclosure, the pixel circuit further comprises a second initialization circuit;

in the data writing phase included in the refresh frame, a second initialization circuit writes a second initial voltage into a first electrode of a light-emitting element under control of a first scanning signal so as to reset the potential of the first electrode of so as to reset the potential of the first electrode of the light-emitting element and clear the residual charge of the first electrode of the light-emitting element;

in the reset phase included in the hold frame, the second initialization circuit writes a second initial voltage to the first electrode of the light-emitting element under control of the first scanning signal to improve the flicker phenomenon.

Figure 3:
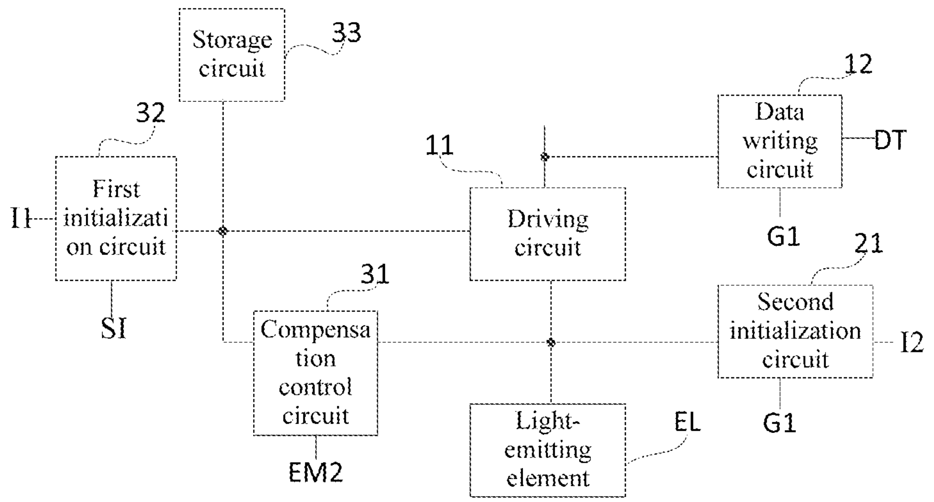
FIG. 3 is a structure diagram of a pixel circuit according to at least one embodiment of the present disclosure.

As shown in FIG. 3, on the basis of the embodiment of the pixel circuit shown in FIG. 2, the pixel circuit according to at least one embodiment of the present disclosure further comprises a second initialization circuit 21;

the second initialization circuit 21 is electrically connected to a first scanning terminal G1, a second initial voltage terminal I2 and a first electrode of the light-emitting element EL, respectively, for writing a second initial voltage Vinit2 provided at the second initial voltage terminal I2 into the first electrode of the light-emitting element EL under control of the first scanning signal during a data writing phase included in the refresh frame, and writing a second initial voltage Vinit2 provided at the second initial voltage terminal I2 into the first electrode of the light-emitting element EL under control of the first scanning signal during a reset phase included in the hold frame.

The pixel circuit according to at least one embodiment of the present disclosure further comprises a first light-emitting control circuit and a second light-emitting control circuit;

the first light-emitting control circuit is electrically connected to a light-emitting control terminal, a power supply voltage terminal and the first terminal of the driving circuit, and is configured to control connection between the power supply voltage terminal and the first terminal of the driving circuit under control of a light-emitting control signal provided by the light-emitting control terminal;

the second light-emitting control circuit is electrically connected to the light-emitting control terminal, the second terminal of the driving circuit and the first electrode of the light-emitting element, and is configured to control connection between the second terminal of the driving circuit and the first electrode of the light-emitting element under control of the light-emitting control signal;

a second electrode of the light-emitting element is electrically connected to a first voltage terminal.

In at least one embodiment of the present disclosure, the pixel circuit may include a first light-emitting control circuit and a second light-emitting control circuit; the first light-emitting control circuit controls connection between a power supply voltage terminal and a first terminal of a driving circuit under control of a light-emitting control signal; the second light-emitting control circuit controls connection between the second terminal of the driving circuit and the first electrode of the light-emitting element under control of the light-emitting control signal.

Figure 4:
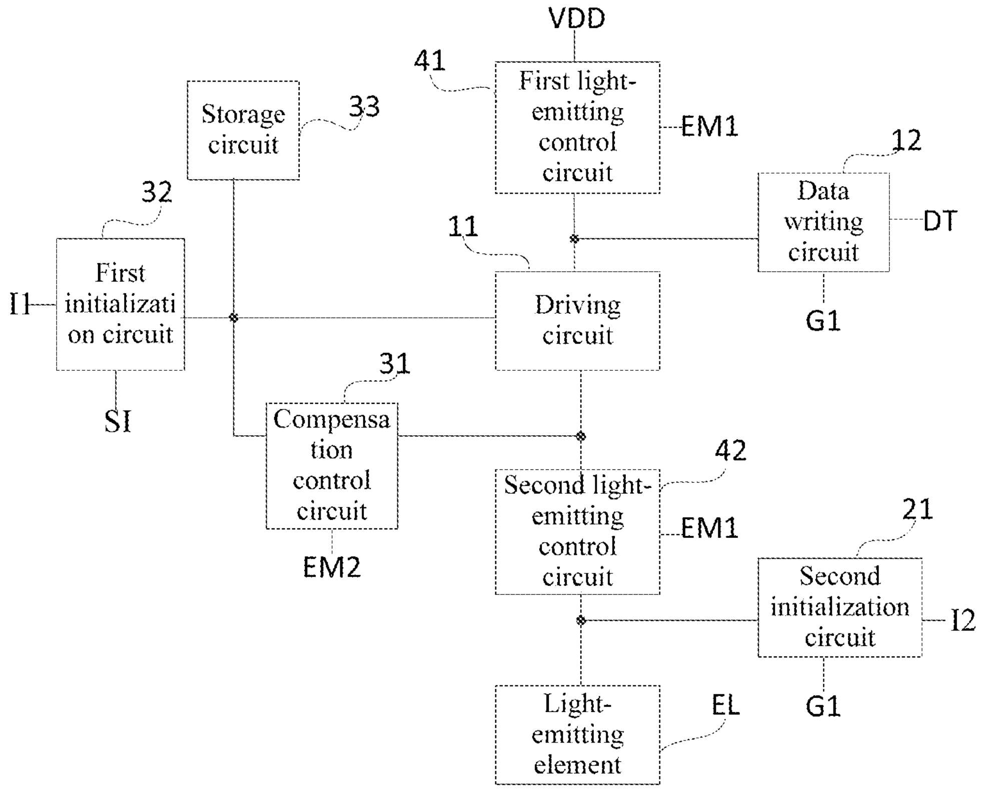
FIG. 4 is a structure diagram of a pixel circuit according to at least one embodiment of the present disclosure.

As shown in FIG. 4, on the basis of at least one embodiment of the pixel circuit shown in FIG. 3, the pixel circuit according to at least one embodiment of the present disclosure further comprises a first light-emitting control circuit 41 and a second light-emitting control circuit 42;

the first light-emitting control circuit 41 is electrically connected to a light-emitting control terminal EM1, a power supply voltage terminal VDD and a first terminal of the driving circuit 11 respectively, and is used for controlling the connection between the power supply voltage terminal VDD and the first terminal of the driving circuit 11 under control of a light-emitting control signal provided by the light-emitting control terminal EM1;

the second light-emitting control circuit 42 is electrically connected to a light-emitting control terminal EM1 respectively, and a second terminal of the driving circuit 11 is electrically connected to a first electrode of the light-emitting element EL for controlling the connection between the second terminal of the driving circuit 11 and the first electrode of the light-emitting element EL under control of the light-emitting control signal;

a second electrode of the light-emitting element EL is electrically connected to a first voltage terminal.

In at least one embodiment of the present disclosure, the first voltage terminal may be, but is not limited to, a low voltage terminal.

Optionally, the light-emitting element may be an organic light-emitting diode, the first electrode of the light-emitting element may be an anode, and the second pole of the light-emitting element may be a cathode, but this is not limiting.

In at least one embodiment of the present disclosure, the driving circuit may comprise a driving transistor, the data writing circuit may comprise a first transistor, the second initialization circuit may comprise a second transistor, the compensation control circuit may comprise a third transistor, the first initialization circuit may comprise a fourth transistor, and the first lighting control circuit comprises a fifth transistor and a sixth transistor;

the storage circuit may comprise a first capacitor C1;

the gate electrode of the first transistor is electrically connected to the first scanning terminal, the first electrode of the first transistor is electrically connected to the data line, and the second pole of the first transistor is electrically connected to the first terminal of the driving circuit;

a gate electrode of the second transistor is electrically connected to the first scanning terminal, a first electrode of the second transistor is electrically connected to the second initial voltage terminal, and a second electrode of the second transistor is electrically connected to the first electrode of the light-emitting element;

the gate electrode of the third transistor is electrically connected to the compensation control terminal, the first electrode of the third transistor is electrically connected to the gate electrode of the driving transistor, and the second pole of the third transistor is electrically connected to the second pole of the driving transistor;

the gate electrode of the fourth transistor is electrically connected to the initial control terminal, the first electrode of the fourth transistor is electrically connected to the first initial voltage terminal, and the second pole of the fourth transistor is electrically connected to the gate electrode of the driving transistor;

a gate electrode of the fifth transistor is electrically connected to the light-emitting control terminal, the first electrode of the fifth transistor is electrically connected to the power supply voltage terminal, and the second pole of the fifth transistor is electrically connected to the first electrode of the driving transistor;

a gate electrode of the sixth transistor is electrically connected to the light-emitting control terminal, the first electrode of the sixth transistor is electrically connected to the second pole of the driving transistor, and the second pole of the sixth transistor is electrically connected to the first electrode of the light-emitting element;

a first terminal of the first capacitor is electrically connected to the gate electrode of the driving transistor, and a second terminal of the first capacitor is electrically connected to the power supply voltage terminal.

Figure 5:
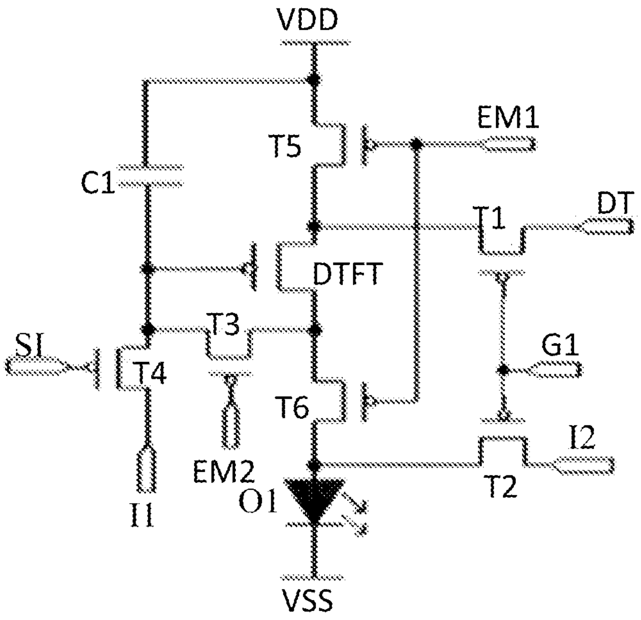
FIG. 5 is a circuit diagram of a pixel circuit according to at least one embodiment of the present disclosure.

As shown in FIG. 5, on the basis of at least one embodiment of the pixel circuit shown in FIG. 4, the driving circuit comprises a driving transistor DTFT, the data writing circuit may comprise a first transistor T1, the second initialization circuit may comprise a second transistor T2, the compensation control circuit may comprise a third transistor T3, the first initialization circuit may comprise a fourth transistor T4, and the first light-emitting control circuit comprises a fifth transistor T5 and a sixth transistor T6;

the storage circuit comprises a first capacitor C1; the light-emitting element is an organic light-emitting diode O1;

the gate electrode of the first transistor T1 is electrically connected to the first scanning terminal G1, the source electrode of the first transistor T1 is electrically connected to the data line DT, and the drain electrode of the first transistor T1 is electrically connected to the source electrode of the driving transistor DTFT;

a gate electrode of the second transistor T2 is electrically connected to the first scanning terminal G1, the source electrode of the second transistor T2 is electrically connected to the second initial voltage terminal I2, and the drain electrode of the second transistor T2 is electrically connected to the anode of the organic light-emitting diode O1;

the gate electrode of the third transistor T3 is electrically connected to the compensation control terminal EM2, the source electrode of the third transistor T3 is electrically connected to the gate electrode of the driving transistor DTFT, and the drain electrode of the third transistor T3 is electrically connected to the drain electrode of the driving transistor DTFT;

the gate electrode of the fourth transistor T4 is electrically connected to the initial control terminal SI, the first electrode of the fourth transistor T4 is electrically connected to the first initial voltage terminal I1, and the drain electrode of the fourth transistor T4 is electrically connected to the gate electrode of the driving transistor DTFT;

the gate electrode of the fifth transistor T5 is electrically connected to the light-emitting control terminal EM1, the source electrode of the fifth transistor T5 is electrically connected to the power supply voltage terminal VDD, and the drain electrode of the fifth transistor T5 is electrically connected to the source electrode of the driving transistor DIFT;

the gate electrode of the sixth transistor T6 is electrically connected to the light-emitting control terminal EM1, the source electrode of the sixth transistor T6 is electrically connected to the drain electrode of the driving transistor DTFT, and the drain electrode of the sixth transistor T6 is electrically connected to the anode of the organic light-emitting diode O1; the cathode of O1 is electrically connected to the low voltage terminal VSS;

a first terminal of the first capacitor C1 is electrically connected to the gate electrode of the driving transistor DTFT, and a second terminal of the first capacitor C1 is electrically connected to the power supply voltage terminal VDD.

In at least one embodiment of the pixel circuit shown in FIG. 5, all transistors are p-type transistors, but this is not limiting.

In at least one embodiment of the pixel circuit shown in FIG. 5, the gate electrode of T1 and the gate electrode of T2 are both electrically connected to the first scanning terminal G1, but are not limited thereto. In actual operation, the gate electrode of T1 and the gate electrode of T2 may also be electrically connected to different control terminals.

In operation, at least one embodiment of the pixel circuit shown in FIG. 5 of the present disclosure, the hold frame includes a reset phase;

In a reset phase included in a hold frame, G1 provides a low voltage signal, T1 is turned on, and a data line DT provides a reset voltage VR so as to write the reset voltage VR into a source electrode of a driving transistor DTFT, so that the driving transistor DTFT is in an on-bias state, improving the hysteresis of the DIFT; T2 is on and the second initial voltage terminal I2 provides the anode of the second initial voltage Vinit2 written to O1 to improve the flicker phenomenon.

In at least one embodiment of the present disclosure, the first scanning signal provided by the first scanning terminal G1 is increased to reset the source of the DTFT and the anode of O1 at a high frequency, thereby improving the stability of light emission at low frequencies and improving low frequency flicker problems.

In at least one embodiment of the present disclosure, the pixel circuit is a LTPS (low temperature polycrystalline silicon) pixel circuit. The LTPS pixel circuit in at least one embodiment of the present disclosure has a simple process flow and less cost compared with a LTPO pixel circuit, can display a stable picture at a frequency lower than 60 Hz without generating better flicker compared with a related LTPS pixel circuit, has a more stable potential of a gate electrode of a DTFT compared with a related LTPS pixel circuit, reduces leakage, and can reduce power consumption at low frequency driving.

Figure 6:
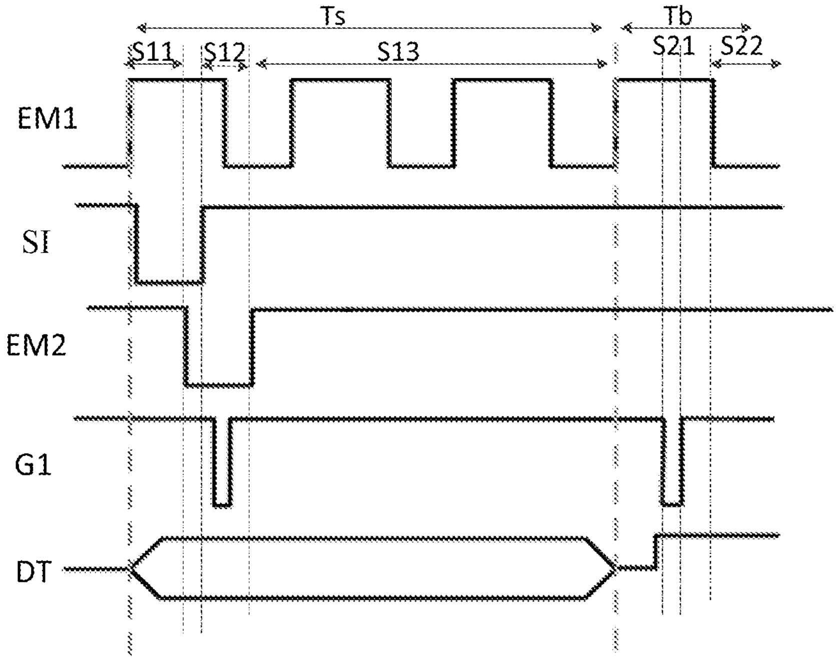
FIG. 6 is an operational timing diagram of at least one embodiment of the pixel circuit shown in FIG. 5.

As shown in FIG. 6, in operation of at least one embodiment of the pixel circuit shown in FIG. 5 of the present disclosure, the display period includes a refresh frame Ts and a hold frame Tb arranged sequentially;

the refresh frame Ts comprises an initialization phase S11, a compensation stage S12 and a refresh light-emitting phase S13 which are arranged successively; the compensation stage S12 comprises a data writing phase;

in an initialization phase S11, an initial control terminal SI provides a low voltage signal, T4 is turned on, and I1 provides a first initial voltage Vinit1 to a gate electrode of the DTFT;

in the compensation stage S12, the compensation control terminal EM2 provides a low voltage signal, T3 is turned on, and the gate electrode of the DTFT is in connection with the drain of the DIFT;

in the data writing phase,

G1 provides a low voltage signal, T1 is turned on, and a data line DT provides a data voltage Vdata to the source electrode of the DTFT so as to charge C1 via the DTFT and T3 until the potential of the gate electrode of the DTFT becomes Vdata+Vth;

T2 is turned on, and I2 provides a second initial voltage Vinit2 to the anode of O1, so as to control the O1 not to emit light, and the anode of O1;

in a refresh light-emitting phase S13, when EM1 provides a low voltage signal, T5 and T6 are turned on, and DTFT drives O1 to emit light;

the hold frame Tb comprises a reset phase S21 and a hold light-emitting phase S22 which are successively set;

in a reset phase S21, G1 provides a low voltage signal, T1 is turned on, and a data line DT provides a reset voltage VR to a source electrode of the DTFT so as to control the DTFT to be in an on-bias state, so as to improve the hysteresis phenomenon of the DTFT, thereby improving the quality of a low grey-scale display image;

T2 is turned on and I2 provides a second initial voltage Vinit2 to the anode of O1 to control O1 not to emit light, removing the charge remaining at the anode of O1, and improving the flicker phenomenon.

In at least one embodiment of the present disclosure, the reset voltage VR may be a high frequency reset voltage.

In the timing chart shown in FIG. 6, there is an overlap time between the time period during which the potential of the initial control signal provided by the SI is maintained at a low voltage and the time period during which the potential of the compensation control signal provided by the compensation control terminal EM2 is maintained at a low voltage, but in actual operation, the time period during which the potential of the initial control signal provided by the SI is maintained at a low voltage and the time period during which the potential of the compensation control signal provided by the compensation control terminal EM2 is maintained at a low voltage may be set successively, and there is no overlap time between each other.

In particular implementation, an initial control signal and a compensation control signal can be provided via the same GOA (Gate On Array, array substrate row driving) module;

a first scanning signal can be provided by a first GOA module, and an initial control signal and a compensation control signal can be provided by a second GOA module;

the second GOA module may comprise a multi-stage second driving circuit;

an initial control signal can be provided for a pixel circuit via an $N^{th}$ stage second driving circuit, and a compensation control signal can be provided for the pixel circuit via a second driving circuit after the $N^{th}$ stage, wherein the second driving circuit after the $N^{th}$ stage can be, for example, an $(N+x)^{th}$ stage second driving circuit, and x can be, for example, 6, 7 or 8; X is a positive integer; N is a positive integer.

The second driving circuit of each stage comprised in the second GOA module may be a 12T3C driving circuit, but is not limited thereto, and the second driving circuit of each stage comprised in the second GOA module may also be a 10T3C driving circuit or a 16T3C driving circuit.

In at least one embodiment of the present disclosure, a first GOA module includes a multi-stage first driving circuit;

the first driving circuit can generate a first drive signal according to the first high voltage VGH and the first low voltage VGL, wherein the first drive signal is a first scanning signal;

the second driving circuit can generate a second drive signal according to the second high voltage VGH2 and the second low voltage VGL2, and the second drive signal can be a compensation control signal;

since the potential of the compensation control signal lasts a low level for a long time, in order to ensure the stability of the compensation control signal, the absolute value of the voltage value of VGH2 is set to be greater than the absolute value of the voltage value of VGH, and the absolute value of the voltage value of VGL2 is set to be greater than the absolute value of the voltage value of VGL.

In at least one embodiment of the present disclosure, the voltage value of VGH may be greater than or equal to 6 V and less than or equal to 8 V, the voltage value of VGH2 may be greater than or equal to 5 V and less than or equal to 9 V, the voltage value of VGL may be greater than or equal to −8 V and less than or equal to −6 V, and the voltage value of VGL2 may be greater than or equal to −9 V and greater than or equal to −5 V.

In at least one embodiment of the present disclosure, the second GOA module is controlled by using independent second high voltage VGH2 and second low voltage VGL2, and such a design can satisfy the compensation control signal and initial control signal controlled by independently regulating the second GOA module so as to achieve better picture quality.

Optionally, the first driving circuit may be an 8T2C circuit, but is not limited thereto, and the first driving circuit may be a shift register outputting a clock signal and a high voltage, or any shift register providing a first scanning signal.

Figure 7:
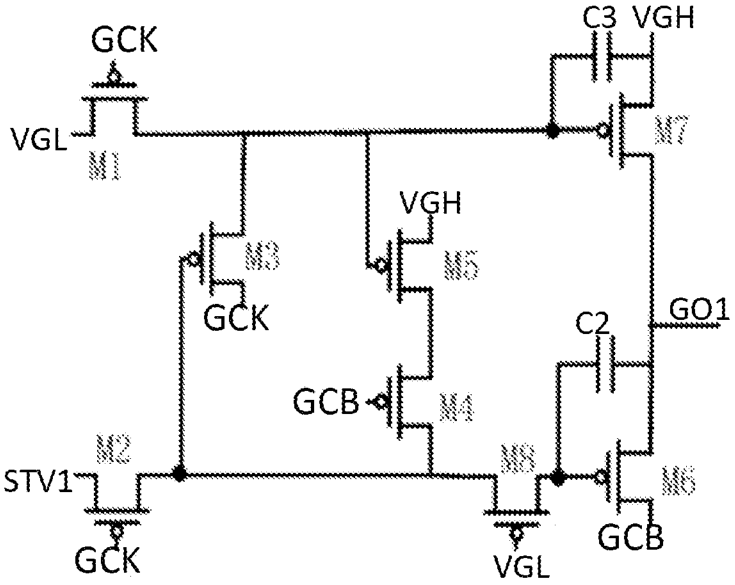
FIG. 7 is a circuit diagram of at least one embodiment of a first driving circuit.

As shown in FIG. 7, at least one embodiment of the first driving circuit may comprise a first control transistor M1, a second control transistor M2, a third control transistor M3, a fourth control transistor M4, a fifth control transistor M5, a sixth control transistor M6, a seventh control transistor M7, an eighth control transistor M8, a second capacitor C2, a third capacitor C3 and a first drive signal terminal GO1;

- a gate electrode of the M1 is electrically connected to a first control clock signal terminal GCK, a first electrode of the M1 is connected to a first low voltage VGL, and a second electrode of the M1 is electrically connected to a gate electrode of the M7;
- the gate electrode of the M2 is electrically connected to the first control clock signal terminal GCK, the first electrode of the M2 is electrically connected to the first start voltage terminal STV1, and the second pole of the M2 is electrically connected to the gate electrode of the M3;
- a first electrode of M3 is electrically connected to a gate electrode of M7, and a second pole of M3 is electrically connected to a first control clock signal terminal GCK;
- the gate electrode of M4 is connected to the second control clock signal terminal GCB, the first electrode of M4 is electrically connected to the second pole of M5, and the second pole of M4 is electrically connected to the gate electrode of M3;
- a gate electrode of M5 is electrically connected to a gate electrode of M7, and a first electrode of M5 is connected to a first high voltage VGH;
- the gate electrode of the M6 is electrically connected to the second electrode of the M8, the first electrode of the M6 is electrically connected to the first drive signal terminal GO1, and the second electrode of the M6 is electrically connected to the second control clock signal terminal GCB;
- a first electrode of the M7 is connected to the first high voltage VGH, and a second pole of the M7 is electrically connected to the first drive signal terminal GO1;
- a gate electrode of the M8 is connected to a first low voltage VGL, a first electrode of the M8 is electrically connected to a gate electrode of the M3, and a second pole of the M8 is electrically connected to a gate electrode of the M6;
- a first terminal of C2 is electrically connected to the first drive signal terminal GO1, and a second terminal of C2 is electrically connected to the gate electrode of M6;
- a first terminal of C3 is electrically connected to the gate electrode of M7, and a second terminal of C3 is connected to a first high voltage VGH.

In at least one embodiment of the first driving circuit shown in FIG. 7, all transistors are p-type transistors, but this is not a limitation.

Figure 8:
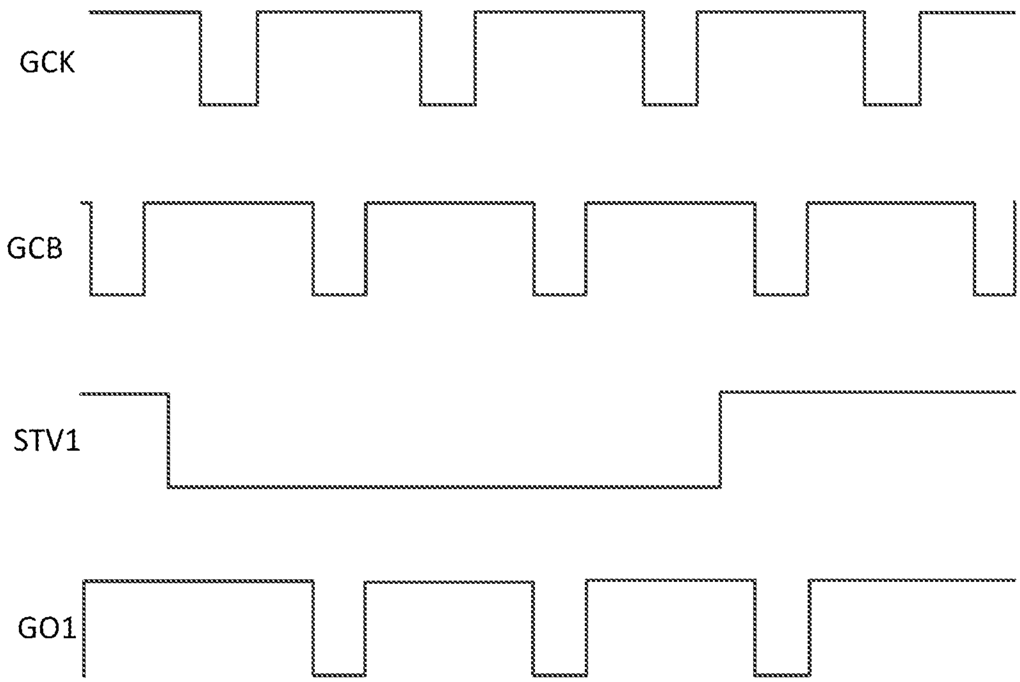
FIG. 8 is an operational timing diagram of at least one embodiment of the first driving circuit shown in FIG. 7.

As shown in FIG. 8, at least one embodiment of the first driving circuit shown in FIG. 7 operates.

When the GCK provides a low voltage signal and the STV1 provides a low voltage signal, the M2 is opened so that the gate electrode of the M6 is connected to the low voltage signal, the M6 is opened, and the GO1 is in connection with the GCB;

- after GCK provides a low voltage signal and STV1 provides a high voltage signal, the potential of the gate electrode of M6 is high and M6 is off.

Figure 9:
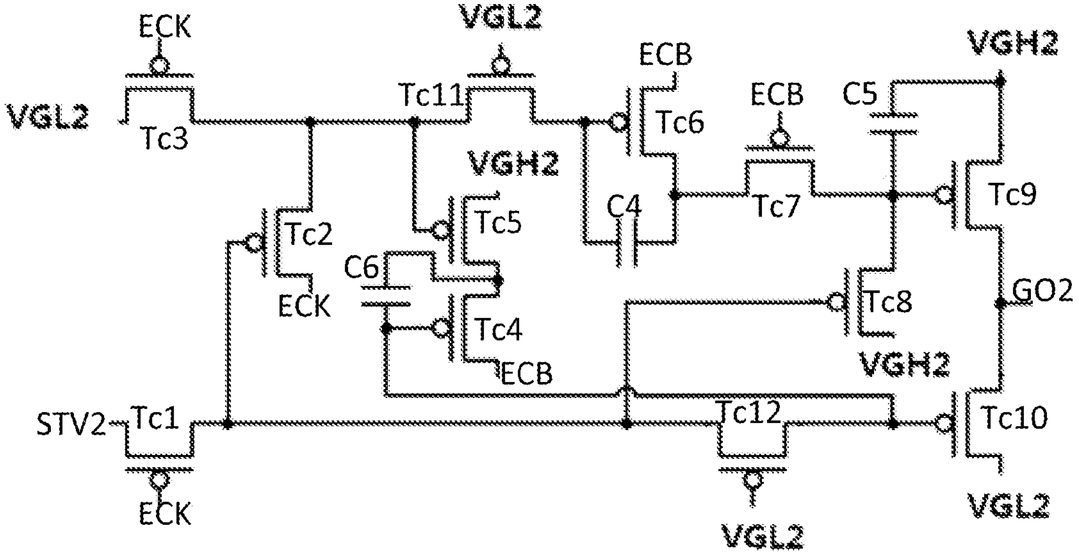
FIG. 9 is a circuit diagram of at least one embodiment of a second driving circuit.

As shown in FIG. 9, at least one embodiment of the second driving circuit comprises a first generation transistor Tc1, a second generation transistor Tc2, a third generation transistor Tc3, a fourth generation transistor Tc4, a fifth generation transistor Tc5, a sixth generation transistor Tc6, a seventh generation transistor Tc7, an eighth generation transistor Tc8, a ninth generation transistor Tc9, a tenth generation transistor Tc10, an eleventh generation transistor Tc11, a twelfth generation transistor Tc12, a fourth capacitance C4, a fifth capacitance C5 and a sixth capacitance C6;

- a gate electrode of the Tc1 is electrically connected to a first clock signal generation terminal ECK, a first electrode of the Tc1 is electrically connected to a second starting voltage terminal STV2, and a second electrode of the Tc1 is electrically connected to a gate electrode of the Tc8;
- a gate electrode of the Tc2 is electrically connected to a second electrode of the Tc1, a first electrode of the Tc2 is electrically connected to a first clock signal generation terminal ECK, and a second electrode of the Tc2 is electrically connected to a second electrode of the Tc3;
- a gate electrode of the Tc3 is electrically connected to a first clock signal generation terminal ECK, and a first electrode of the Tc3 is connected to a second low voltage VGL2;
- a gate electrode of the Tc4 is electrically connected to a gate electrode of the Tc10, a first electrode of the Tc4 is electrically connected to a second clock signal generation terminal ECB, and a second pole of the Tc4 is electrically connected to a first electrode of the Tc5;
- a gate electrode of the Tc5 is electrically connected to a second electrode of the T3, and the second electrode of the Tc5 is connected to a second high voltage VGH2;
- a gate electrode of the Tc6 is electrically connected to a second electrode of the T11, a first electrode of the Tc6 is electrically connected to a second clock signal generation terminal ECB, and a second electrode of the Tc6 is electrically connected to a first electrode of the Tc7;
- a gate electrode of the Tc7 is electrically connected to the second clock signal generation terminal ECB, and the second pole of the Tc7 is electrically connected to the gate electrode of the T9;
- a gate electrode of the Tc8 is electrically connected to a first electrode of the T12, the first electrode of the Tc8 is connected to a second high voltage VGH2, and a second electrode of the Tc8 is electrically connected to a gate electrode of the Tc9;
- a first electrode of the Tc9 is connected to a second high voltage VGH2, and a second pole of the Tc9 is electrically connected to a second drive signal terminal GO2;
- a gate electrode of the Tc10 is electrically connected to a second electrode of the T12, a first electrode of the Tc10 is connected to a second low voltage VGL2, and a second electrode of the Tc10 is electrically connected to a second drive signal terminal (GO2);
- a gate electrode of the Tc11 is connected to a second low voltage VGL2, a first electrode of the Tc11 is electrically connected to a second electrode of the Tc3, and a second electrode of the Tc11 is electrically connected to a gate electrode of the T6;
- a gate electrode of the Tc12 is connected to a second low voltage VGL2, a first electrode of the Tc12 is electrically connected to a gate electrode of the T8, and a second pole of the Tc12 is electrically connected to a gate electrode of the Tc10;
- a first terminal of C4 is electrically connected to a gate electrode of Tc6, and a second terminal of C4 is electrically connected to a first electrode of Tc7;

a first terminal of C5 is electrically connected to a gate electrode of the Tc9, and a second terminal of C5 is connected to a second high voltage VGH2;

a first terminal of C6 is electrically connected to the gate electrode of Tc4 and a second terminal of C6 is electrically connected to a first electrode of Tc5.

In at least one embodiment of the second driving circuit shown in FIG. 9, all transistors are p-type transistors, but this is not limiting.

A pixel driving method according to an embodiment of the present disclosure, applied to the above-mentioned pixel circuit, wherein a display period comprises a refresh frame and a hold frame; the refresh frame comprises a data writing phase, and the hold frame comprises a reset phase; the pixel driving method comprises:

in the data writing phase included in the refresh frame, a data writing circuit writes a data voltage provided by a data line into a first terminal of a driving circuit under control of a first scanning signal;

in the reset phase included in the hold frame, the data writing circuit writes a reset voltage provided by the data line into a first terminal of the driving circuit under control of the first scanning signal so that a driving transistor included in the driving circuit is in a bias state.

The embodiment of the present disclosure controls the driving transistor in the on-bias state during the reset phase included in the hold frame to improve the characteristic drift phenomenon of the driving transistor, improve the hysteresis phenomenon, and improve the quality of the low gray scale display.

Optionally, the pixel circuit further comprises a second initialization circuit: the pixel driving method further comprises:

in the data writing phase included in the refresh frame, the second initialization circuit writes a second initial voltage provided by a second initial voltage terminal into the first electrode of the light-emitting element under control of the first scanning signal;

in the reset phase included in the hold frame, the second initialization circuit writes the second initial voltage provided by the second initial voltage terminal into the first electrode of the light-emitting element under control of the first scanning signal.

In at least one embodiment of the present disclosure, the hold frame further includes a hold light-emitting phase, the reset phase and the hold light-emitting phase being independent from each other; the pixel circuit further comprises a first light-emitting control circuit and a second light-emitting control circuit; the pixel driving method further comprises:

in the hold light-emitting phase, the first light-emitting control circuit controls connection between the power supply voltage terminal and the first terminal of the driving circuit under control of the light-emitting control signal; the second light-emitting control circuit controls connection between the second terminal of the driving circuit and the first electrode of the light-emitting element under control of the light-emitting control signal, and the driving circuit drives the light-emitting element under control of the potential of the control terminal thereof.

Optionally, the pixel circuit further comprises a compensation control circuit, a first initialization circuit and a storage circuit; the refresh frame further comprises an initialization phase, a compensation stage and a refresh light-emitting phase which are arranged successively; the data writing phase is comprised in the compensation phase; the pixel driving method further comprises:

in the initialization phase, the first initialization circuit controls to provide a first initial voltage to a control terminal of the driving circuit under control of an initial control signal;

in the compensation phase, the compensation control circuit controls connection between the control terminal of the driving circuit and a second terminal of the driving circuit under control of a compensation control signal;

in refresh light-emitting phase, the first light-emitting control circuit controls connection between a power supply voltage terminal and the first terminal of the driving circuit under control of a light-emitting control signal; the second light-emission control circuit controls connection between the second terminal of the driving circuit and a first electrode of the light-emitting element under control of the light-emission control signal, and the driving circuit drives the light-emitting element under control of a potential of the control terminal thereof.

The display device described in this embodiment includes the pixel circuit described above.

In at least one embodiment of the present disclosure, the pixel circuit further includes a compensation control circuit, a first initialization circuit, and a storage circuit;

the display device further comprises a first GOA module and a second GOA module;

the first GOA module is configured to generate a first scanning signal;

the second GOA module is configured to generate a compensation control signal and an initial control signal.

Optionally, the pixel circuit further comprises a first light-emitting control circuit and a second light-emitting control circuit; the display device further comprises a third GOA module, and the third GOA module is configured to generate a light-emitting control signal.

In particular implementations, the first GOA module may be a multi-stage first driving circuit, the second GOA module may comprise a multi-stage second driving circuit, and the third GOA module may comprise a multi-stage third driving circuit.

Figure 10:
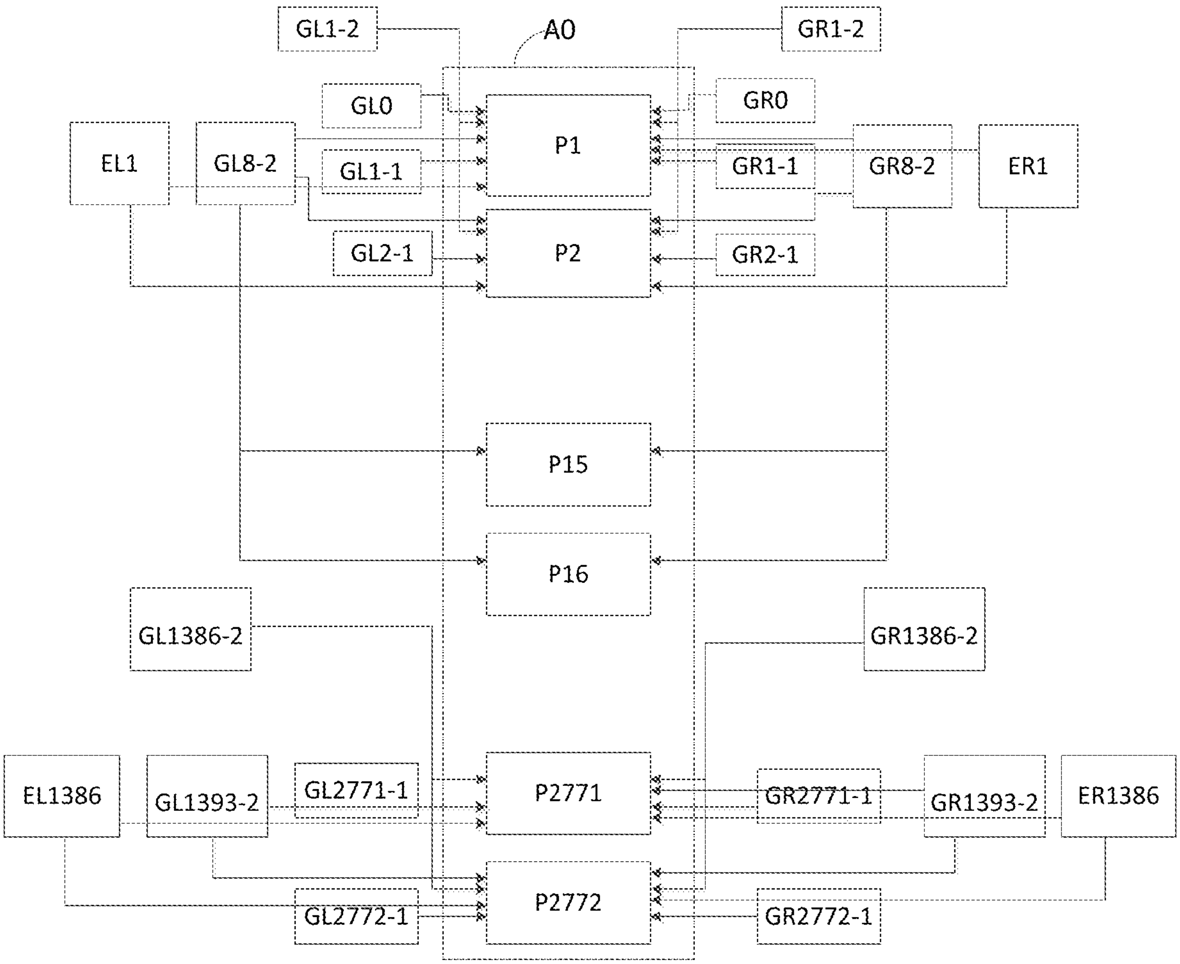
FIG. 10 is a block diagram of a display device according to at least one embodiment of the present disclosure.

As shown in FIG. 10, a display device according to at least one embodiment of the present disclosure comprises a first row of pixel circuits P1 to a $2772^{th}$ row of pixel circuits P2772;

in FIG. 10, reference numeral P2 denotes a second row of pixel circuits, reference numeral P15 denotes a fifteenth row of pixel circuits, reference numeral P16 denotes a sixteenth row of pixel circuits, and reference numeral P2771 denotes a $2771^{th}$ row of pixel circuits.

As shown in FIG. 10, in at least one embodiment of the present disclosure, a first stage first driving circuit may be used to provide a first scanning signal to one row of pixel circuits, a first stage second driving circuit may be used to provide a compensation control signal to two rows of pixel circuits, a first stage third driving circuit may be used to provide a light-emitting control signal to two rows of pixel circuits, and the first driving circuit, the second driving circuit, and the third driving circuit may be provided on both left and right sides of the display area A0.

In FIG. 10, reference numeral GL1-1 is a first stage left first driving circuit, reference numeral GR11 is a first stage right first driving circuit, reference numeral GL2-1 is a second stage left first driving circuit, reference numeral GR21 is a second stage right first driving circuit, reference mineral GL2771-1 is a 2771 stage left first driving circuit, reference numeral GR2771-1 is a 2771 stage right first driving circuit, reference numeral GL2772-1 is a 2772 stage left first driving circuit, and reference numeral GR2772-1 is a 2772 stage right first driving circuit; the reference sign GL0 is a left side starting signal generation circuit, and the reference sign GR0 is a right side starting signal generation circuit;

- the reference numeral GL1-2 is a first stage left second driving circuit, the reference numeral GR1-2 is a first stage right second driving circuit, the reference numeral GL8-2 is an eighth stage left second driving circuit, the reference numeral GR8-2 is an eighth stage right second driving circuit, the reference numeral GL1386-2 is a 1386 stage left second driving circuit, the reference numeral GR1386-2 is a 1386 stage right second driving circuit, the reference numeral GL1393-2 is a 1393 stage left second driving circuit, and the reference numeral GR1393-2 is a 1393 stage right second driving circuit;
- reference numeral EL1 is a first stage left side third driving circuit, reference numeral ER1 is a first stage right side third driving circuit, reference numeral EL1386 is a 1386$^{th}$ stage left side third driving circuit, and reference numeral ER1386 is a 1386$^{th}$ stage right side third driving circuit.

In operation of at least one embodiment of the display device illustrated in FIG. 10, GL1-2 and GR1-2 provide initial control signals for a first row of pixel circuits P1 and a second row of pixel circuits P2;

- GL8-2 and GR8-2 provide compensation control signals for the fifteenth row of pixel circuits P15 and the sixteenth row of pixel circuits P16;
- GL1386-2 and GR1386-2 provide an initial control signal for the 2771$^{th}$ row pixel circuit P2771 and the 2772$^{th}$ row pixel circuit P2772, and GL1393-2 and GR1393-2 provide a compensation control signal for the 2771$^{th}$ row pixel circuit P2771 and the 2772$^{th}$ row pixel circuit P2772;
- EL1 and ER1 provide a light-emitting control signal for a first row of pixel circuits P1 and a second row of pixel circuits P2; EL8 and ER8 provide a light-emitting control signal for a fifteenth row of pixel circuits P15 and a sixteenth row of pixel circuits P16; EL1386 and ER1386 provide a light-emitting control signal for a 2771$^{th}$ row of pixel circuits P2771 and a 2771$^{th}$ row of pixel circuits P2772;
- GL1-1 and GR1-1 provide a first scanning signal for the first row of pixel circuits P1, GL2-1 and GR2-1 provide a first scanning signal for the second row of pixel circuits P2, GL2771-1 and GR2771-1 provide a first scanning signal for the 2771$^{th}$ row of pixel circuits P2771, and GL2772-1 and GR2772-1 provide a first scanning signal for the 2772$^{th}$ row of pixel circuits P2772.

In at least one embodiment of the present disclosure, the first GOA module is electrically connected to a first voltage line and a second voltage line for generating the first scanning signal according to a first voltage signal provided by the first voltage line and a second voltage signal provided by the second voltage line;

- the second GOA module is electrically connected to a third voltage line and a fourth voltage line, and is configured to generate the compensation control signal and the initial control signal according to a third voltage signal provided by the third voltage line and a fourth voltage signal provided by the fourth voltage line.

Optionally, the first voltage line is for providing a first high voltage signal and the second voltage line is for providing a first low voltage signal;

- the third voltage line is configured to provide a second high voltage signal, and the fourth voltage line is configured to provide a second low voltage signal;
- a voltage value of the first high voltage signal is different from a voltage value of the second high voltage signal, and a voltage value of the first low voltage signal is different from a voltage value of the second low voltage signal.

In at least one embodiment of the present disclosure, the absolute value of the voltage value of the second high voltage signal is set to be greater than the absolute value of the voltage value of the first high voltage signal and the absolute value of the voltage value of the second low voltage signal is set to be greater than the absolute value of the voltage value of the second low voltage signal in order to ensure the stability of the compensation control signal, since the potential of the compensation control signal lasts a low level for a long time.

A display device according to at least one embodiment of the present disclosure further includes a first resistor and a second resistor;

- the first voltage line is electrically connected to the third voltage line through the first resistor, and the second voltage line is electrically connected to the fourth voltage line through the second resistor;
- a resistance value of the first resistor is greater than a resistance value threshold and a resistance value of the second resistor is greater than a resistance value threshold.

In at least one embodiment of the present disclosure, the first voltage line may be a first high voltage line VH1, the second voltage line may be a first low voltage line VL1, the third voltage line may be a second high voltage line VH2, and the fourth voltage line may be a second low voltage line VL2;

Since two groups of high voltage lines and two groups of low voltage lines are present, in order to prevent the occurrence of ESD (Electro-Static discharge) while reducing the load of ESD voltage conduction on the high voltage lines and the low voltage lines, VH1 and VH2 are connected in series with a large resistance on the top of the Panel (panel), and VL1 and VL2 are connected in series with a large resistance to ensure signal stability and reduce the risk of ESD breaking through the high voltage lines and the low voltage lines.

In at least one embodiment of the present disclosure, the resistor design may adopt a serpentine design so as to improve the resistance value of the resistor, wherein the first high voltage line VH1 is electrically connected to the second high voltage line VH2 via the first resistor R1, and the first low voltage line VL1 is electrically connected to the second low voltage line VL2 via the second resistor R2, and the resistance value of the first resistor R1 and the resistance value of the second resistor are greater than or equal to 10 kilo-ohms and less than or equal to 20 kilo-ohms, so as to ensure that there is no short circuit between the voltage lines and ensure that the ESD voltage can mutually pass through, so as to reduce the purpose of breaking through a certain metal line.

Figure 11:
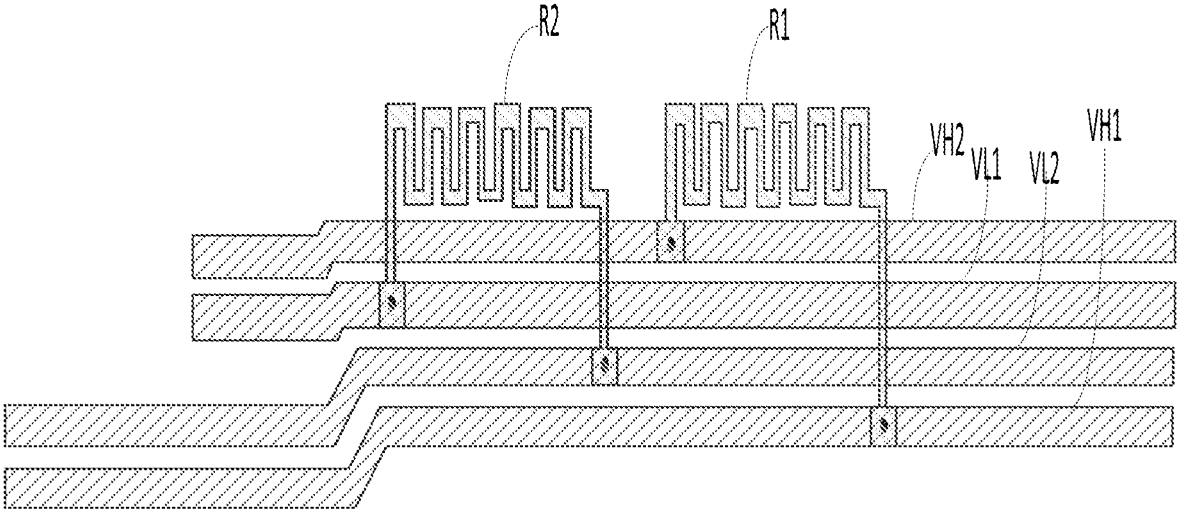
FIG. 11 is a schematic diagram showing a connection relationship between a voltage line and a resistor in a display device according to at least one embodiment of the present disclosure.

As shown in FIG. 11, the first high voltage line VH1, the second high voltage line VH2, the first low voltage line VL1 and the second low voltage line VL2 may all be formed on the first metal layer;

The first resistor R1 and the second resistor R2 can be formed on a conductive layer;

VH1 is electrically connected to VH2 via R1 and VL1 is electrically connected to VL2 via R2.

As shown in FIG. 11, the first resistor R1 and the second resistor R2 have a serpentine design.

While the foregoing is directed to the preferred embodiments of the present disclosure, it will be understood by those skilled in the art that numerous modifications and adaptations may be made without departing from the principles of the disclosure, and such modifications and adaptations are intended to be within the scope of the disclosure.

What is claimed is:

1. A display device, comprising a pixel circuit, the pixel circuit comprises: a light-emitting element, a driving circuit, and a data writing circuit;

the data writing circuit is electrically connected to a first scanning terminal, a data line and a first terminal of the driving circuit, and is configured to write a data voltage provided by the data line into the first terminal of the driving circuit under control of a first scanning signal provided by the first scanning terminal during a data writing phase included in a refresh frame, and write a reset voltage provided by the data line into the first terminal of the driving circuit under control of the first scanning signal during a reset phase included in a hold frame;

the driving circuit is configured to drive the light-emitting element under control of a potential of a control terminal thereof, wherein the pixel circuit further comprises a compensation control circuit, a first initialization circuit and a storage circuit;

the display device further comprises a first GOA circuit and a second GOA circuit;

the first GOA circuit is configured to generate the first scanning signal;

the second GOA circuit is configured to generate a compensation control signal and an initial control signal.

2. The display device according to claim 1, wherein the second GOA circuit comprises a multi-stage second driving circuit;

an $N^{th}$ stage second driving circuit is configured to provide the initial control signal for the pixel circuit, and an $(N+x)^{th}$ stage second driving circuit is configured to provide a compensation control signal for the pixel circuit; N and x are both positive integers.

3. The display device according to claim 1, wherein the first GOA circuit is electrically connected to a first voltage line and a second voltage line, and is configured to generate the first scanning signal according to a first voltage signal provided by the first voltage line and a second voltage signal provided by the second voltage line;

the second GOA circuit is electrically connected to a third voltage line and a fourth voltage line, and is configured to generate the compensation control signal and the initial control signal according to a third voltage signal provided by the third voltage line and a fourth voltage signal provided by the fourth voltage line.

4. The display device according to claim 3, wherein the first voltage line is configured to provide a first high voltage signal, and the second voltage line is configured to provide a first low voltage signal;

the third voltage line is configured to provide a second high voltage signal, and the fourth voltage line is configured to provide a second low voltage signal;

a voltage value of the first high voltage signal is different from a voltage value of the second high voltage signal, and a voltage value of the first low voltage signal is different from a voltage value of the second low voltage signal.

5. The display device according to claim 4, further comprising a first resistor and a second resistor;

the first voltage line is electrically connected to the third voltage line through the first resistor, and the second voltage line is electrically connected to the fourth voltage line through the second resistor;

a resistance value of the first resistor is greater than a resistance value threshold and a resistance value of the second resistor is greater than a resistance value threshold.

6. The display device according to claim 4, wherein the pixel circuit further comprises a first light-emitting control circuit and a second light-emitting control circuit; the display device further comprises a third GOA circuit, and the third GOA circuit is configured to generate a light-emitting control signal.

7. The display device according to claim 3, further comprising a first resistor and a second resistor;

the first voltage line is electrically connected to the third voltage line through the first resistor, and the second voltage line is electrically connected to the fourth voltage line through the second resistor; a resistance value of the first resistor is greater than a resistance value threshold and a resistance value of the second resistor is greater than a resistance value threshold.

8. The display device according to claim 3, wherein the pixel circuit further comprises a first light-emitting control circuit and a second light-emitting control circuit; the display device further comprises a third GOA circuit, and the third GOA circuit is configured to generate a light-emitting control signal.

* * * * *